United States Patent [19]

Parr

[11] Patent Number: 4,944,648
[45] Date of Patent: Jul. 31, 1990

[54] TRAILER ASSEMBLY

[76] Inventor: Willard J. Parr, 230 S. West St., Yerrington, Nev. 89477

[21] Appl. No.: 363,279

[22] Filed: Jun. 8, 1989

[51] Int. Cl.⁵ .............................................. B60D 1/16
[52] U.S. Cl. ............................. 414/483; 280/405.1; 280/638; 414/436; 414/482; 414/490
[58] Field of Search .................. 414/24.5, 434, 435, 414/436, 469, 482, 483, 484, 485, 490; 280/405.1, 638, 656, 789, 47.131

[56] References Cited

U.S. PATENT DOCUMENTS

| | | | |
|---|---|---|---|
| 1,404,335 | 1/1922 | Barnes | 414/469 |
| 2,623,760 | 12/1952 | Fornelius | 280/179 |
| 3,412,882 | 11/1968 | Stockwell | 414/469 |
| 3,455,474 | 7/1969 | Truncali | 214/505 |
| 3,623,744 | 11/1971 | Bertness | 280/789 X |
| 3,720,336 | 3/1973 | Murray et al. | 414/482 X |
| 3,885,690 | 5/1975 | Van Slambrouck | 414/485 |
| 3,896,956 | 7/1975 | Hostetler | 414/24.5 |
| 3,935,954 | 2/1976 | Woods et al. | 414/24.5 |
| 4,023,690 | 5/1977 | Goode | 414/24.5 |
| 4,023,693 | 5/1977 | Priefert | 414/24.5 |
| 4,044,967 | 8/1977 | Guichon | 242/86.5 |
| 4,215,963 | 8/1980 | Doner | 414/24.5 |
| 4,248,561 | 2/1981 | Graves | 280/656 X |
| 4,295,772 | 10/1981 | Zimmerman | 414/38 |
| 4,348,143 | 9/1982 | Hedgespeth | 414/24.5 |
| 4,394,105 | 7/1983 | Mitchell | 414/436 |
| 4,412,768 | 11/1983 | Bauer et al. | 414/24.5 |
| 4,527,935 | 7/1985 | Fortenberry | 414/24.5 |
| 4,573,845 | 3/1986 | Carpenter | 414/24.5 |
| 4,634,336 | 1/1987 | Pearle | 414/24.5 X |
| 4,666,359 | 5/1987 | Parr | 414/485 |

FOREIGN PATENT DOCUMENTS

| | | | |
|---|---|---|---|
| 8931 | 3/1980 | European Pat. Off. | 280/789 |
| 2352458 | 10/1972 | Fed. Rep. of Germany | 280/638 |
| 2551715 | 3/1985 | France | 280/656 |

*Primary Examiner*—Frank E. Werner
*Assistant Examiner*—Robert S. Katz
*Attorney, Agent, or Firm*—Brown, Martin, Haller & McClain

[57] ABSTRACT

A trailer assembly comprises spaced wheels connected by an axle, an elongate tow bar assembly projecting forwardly from the axle, and a load carrying frame pivotally mounted on the axle for movement between an upright, ground position for loading and unloading, a first towing position in which the frame is inclined forwardly, and a second towing position in which the frame is horizontal. First and second latching mechanisms are provided for releasably latching the frame in the first and second towing positions, respectively.

17 Claims, 2 Drawing Sheets

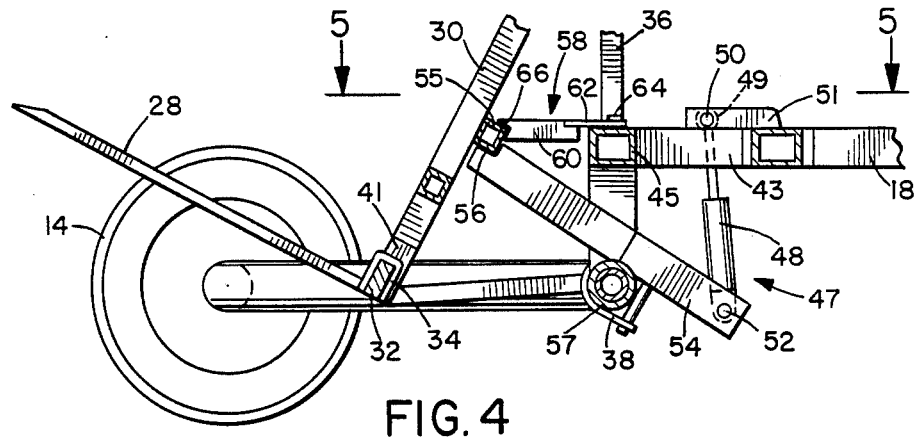
FIG. 4
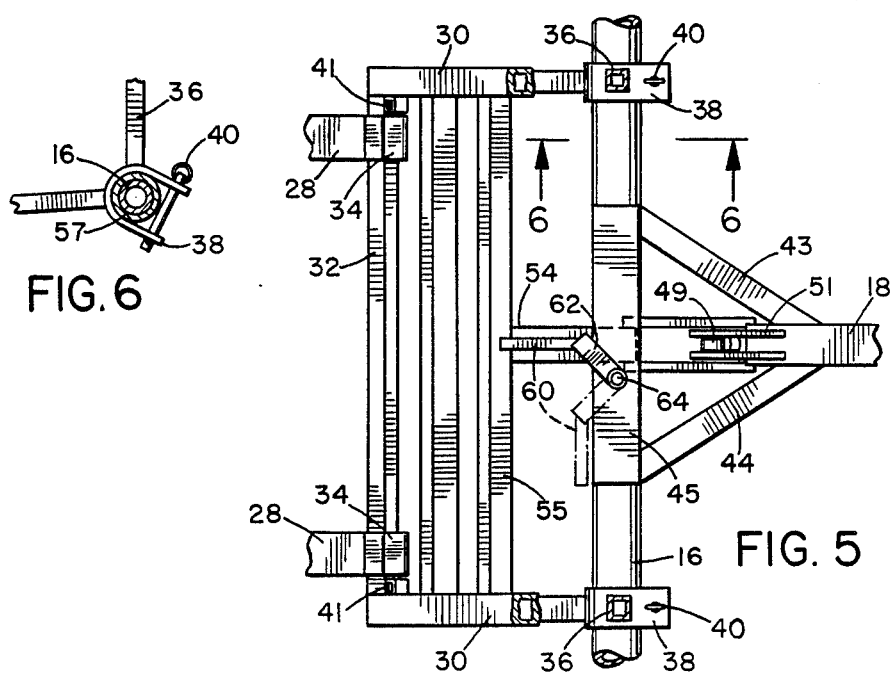
FIG. 6
FIG. 5
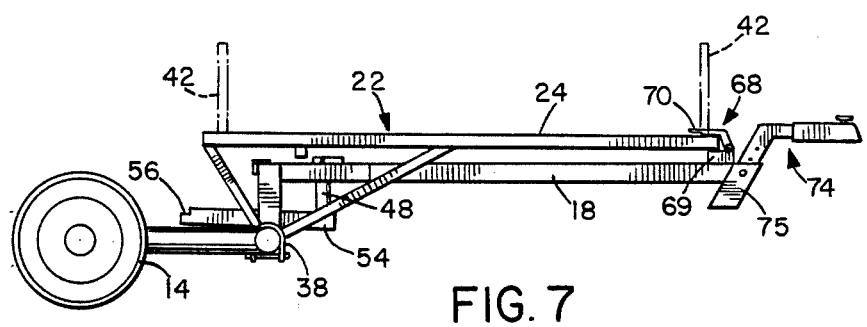
FIG. 7

TRAILER ASSEMBLY

BACKGROUND OF THE INVENTION

The present invention relates generally to a trailer assembly for towing loads behind vehicles, and is particularly concerned with a trailer assembly designed to support either a standard wheeled dolly carrying a load, or other types of loads.

In my U.S. Pat. No. 4,666,359 entitled "Towable Dolly", a trailer assembly was described which included a frame of the shape of a standard dolly pivotally mounted on a wheel assembly for movement between a ground position in which standard dollies bearing loads could be wheeled onto the horizontal part of the frame, and an inclined, towing position in which the frame was tilted forwardly and away from the ground to support the dolly and associated load during towing. This avoids the need to unload heavy materials from wheeled dollies onto trailers or truck beds prior to transportation, and to subsequently reload them when the destination is reached.

SUMMARY OF THE INVENTION

It is an object of this invention to provide an improved trailer assembly.

According to the present invention, a trailer assembly is provided which comprises a wheel assembly including spaced wheels connected by an axle, and an elongate tow bar assembly secured to the wheel assembly and projecting forwardly from the wheel assembly, the tow bar assembly having a securing device at its forward end for securing it to a vehicle towing point or hitch. A load supporting frame is pivotally secured to the wheel assembly for movement between a ground position in which the frame is upright, a first towing position in which the frame is inclined forwardly, and a second towing position in which the frame projects horizontally from the wheel assembly in the same direction as the tow bar assembly to form a flat, horizontal load supporting bed or base. A first latching mechanism is provided for releasably latching the frame in the first towing position. Preferably, the frame rests on the tow bar in the second towing position, and a second latching mechanism is provided to releasably latch the frame in the second towing position. Preferably, a lifting device such as a jack or the like acts between the tow bar assembly and the frame for moving the frame between the ground position and the first towing position.

The frame is preferably generally L-shaped, with the longer arm of the L-shape being upright, inclined forwardly, and horizontal, respectively, in the respective ground, first towing, and second towing positions. The shorter arm comprises a load supporting platform in the first towing position, and may be removably mounted on the frame so that it can be removed when the frame is in the second towing position in which it acts as a flat bed trailer.

Thus, the trailer assembly of this invention can be used selectively either for transporting a standard dolly or other heavy load in the first towing position, in a similar manner to the towable dolly of my earlier patent discussed above, or for transporting a load on a horizontal flat bed. Typically, if a load is not too heavy, the second, flat bed towing position will be used, where the load is supported over the tow bar assembly. For heavier loads, the first, inclined towing position over the wheels will be used.

Preferably, a lifting device such as an hydraulic jack or the like is provided between the tow bar assembly and the frame for urging the frame between the ground position and the first towing, or fork-lift position. The lifting device is releasable from the frame to allow the frame to be moved by hand into the second towing position if the trailer is to be used with the frame horizontal. Loads may be supported directly on the frame, or a solid load carrying bed may be used on the longer arm of the frame in the horizontal position.

The first towing position of the trailer assembly therefore is similar to a fork lift position, while the second position corresponds to a standard flat bed trailer. Thus, a single trailer assembly can be easily converted to act as a fork lift or as a standard trailer according to the load to be transported, providing a convenient and versatile towing device.

BRIEF DESCRIPTION OF THE DRAWINGS

The present invention will be better understood from the following detailed description of a preferred embodiment of the invention, taken in conjunction with the accompanying drawings, in which like reference numerals refer to like parts, and in which:

FIG. 4 is a sectional view taken on line 4—4 of FIG. 3, with the frame tilted to the first towing position;

FIG. 5 is a view taken on line 5—5 of FIG. 4;

FIG. 6 is a sectional view taken on line 6—6 of FIG. 5; and

FIG. 7 is a side elevation view of the assembly with the frame lowered to the second towing position in which it forms a flat bed trailer.

DESCRIPTION OF THE PREFERRED EMBODIMENT

Figure 1:
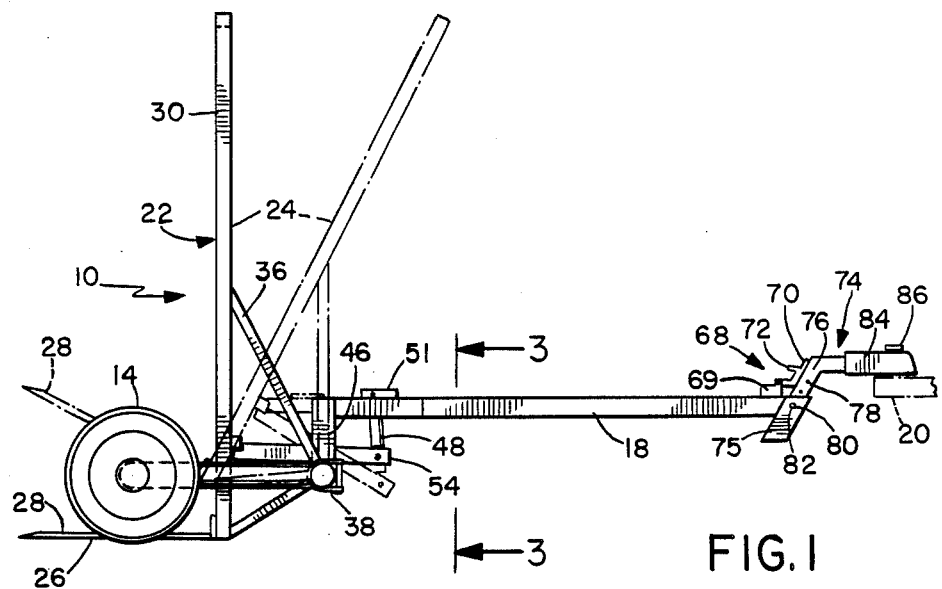
FIG. 1 is a side elevation view of the trailer assembly showing the loading and first towing position of the load carrying frame.

The drawings illustrate a trailer assembly 10 according to a preferred embodiment of the present invention. The trailer assembly 10 basically comprises a wheel assembly 12 including spaced wheels 14 with a forwardly offset axle member 16 connecting the wheels together, an elongate tow bar 18 connected to the axle member 16 and projecting forwardly from the wheel assembly for connection to the towing point or hitch 20 on a vehicle at its forward end, and a load supporting frame 22 pivotally mounted on the wheel assembly.

Figure 2:
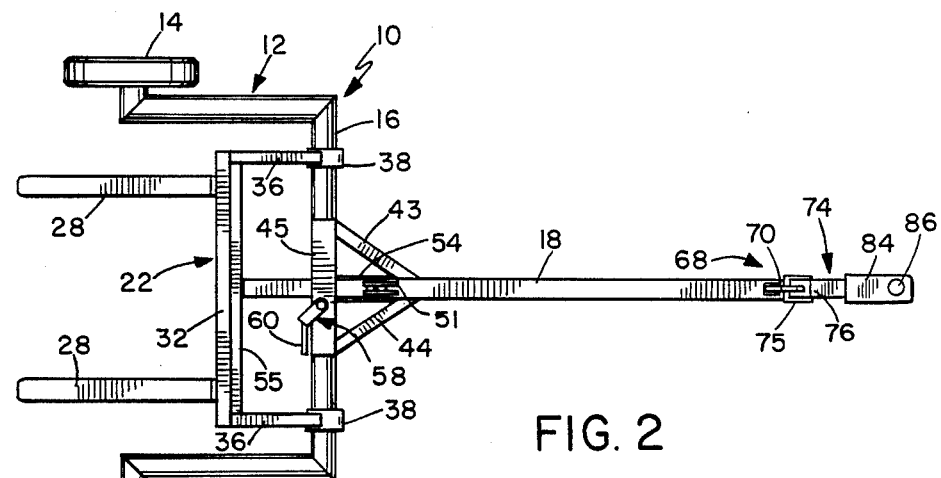
FIG. 2 is a top plan view of the structure of FIG. 1.

In the preferred embodiment illustrated, the load supporting frame 22 is generally L-shaped and comprises a longer arm or platform member 24 and a shorter arm or platform member 26. The shorter arm 26 may consist of spaced tongues 28 as illustrated in FIG. 2, or may comprise a solid platform. Preferably, the shorter arm 26 is releasably mounted on the frame. The longer arm may also comprise an open framework as illustrated, or a solid platform. In the preferred embodiment illustrated, the longer arm comprises spaced outer rods or bars 30 connected by horizontal cross bars 32 to form a generally rectangular framework. The tongues 28 have hooks 34 at their inner ends which hook over the lowermost cross bar 32 as best illustrated in FIG. 4, to releasably retain the tongues on the frame.

The frame is pivotally mounted on the axle via a pair of spaced triangular pivot arms 36 extending from the rear of the frame. The arms 36 are each pivoted to the axle at their apex via releasable C-shaped pivot brackets 38 rotatably secured around the axle via releasable pins 40 (see FIGS. 1 to 3 and 6). This allows the frame to move between the ground or loading position illustrated in FIG. 1 in which the longer arm of the frame is upright and the shorter arm is flat on the ground, the first towing position illustrated in dotted outline in FIG. 1 in which the frame is inclined forwardly, and the second towing position illustrated in FIG. 7, in which the frame is horizontal to form a flat bed trailer. In the second towing position, the shorter arm or platform is not needed and may be removed if desired. The longer arm or platform member is preferably provided with sockets 41 at its corners, as illustrated in FIGS. 5 and 7, for receiving support posts 42 in the flat bed position of FIG. 7. These can be used if needed for supporting loads in the horizontal towing position. The frame may be removed from the wheel assembly if desired simply by releasing pins 40.

The rear end of the tow bar assembly is secured to the axle 16 via a triangular extension piece comprising forked arms 43,44 and a cross bar 45 connecting the free ends of arms 43,44. Vertical legs 46 project downwardly from the ends of arms 43,44 to axle 16, and are welded to the axle to connect the tow bar assembly rigidly to the axle.

Figure 3:
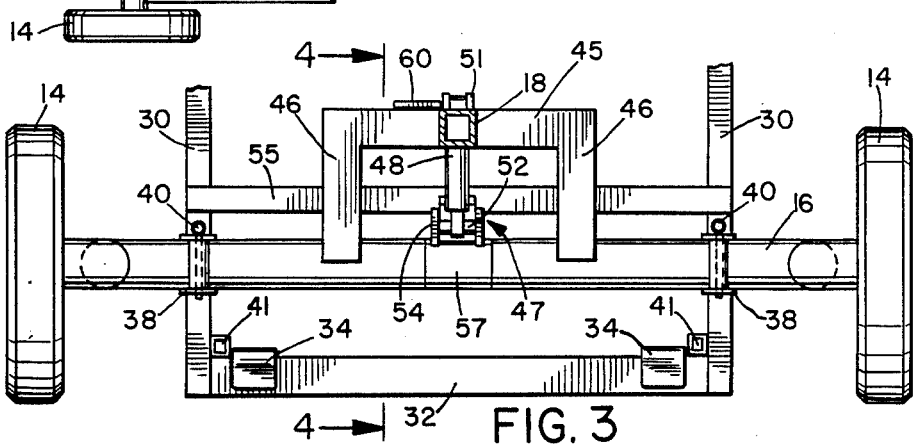
FIG. 3 is an enlarged sectional view taken on line 3—3 of FIG. 1.

A lifting device 47 is provided for raising the frame between the ground position and the first towing position, illustrated in solid and dotted line outline, respectively, in FIG. 1. In the preferred embodiment illustrated, the lifting device comprises a hydraulic jack 48 acting between the tow bar 18 and the frame 22. The jack 48 is pivotally connected at one end to the tow bar 18 via pivot pin 50, as best illustrated in FIGS. 4 and 5. The end 49 of the tow bar is located between fingers 51 which extend rearwardly from the rear end of the tow bar. Pin 50 extends through aligned openings in the fingers and end 49 of the jack. The opposite end of the jack 48 is pivotally connected via pivot 52 to one end of a lever arm 54. The longer arm or platform member 24 of the frame 22 has an additional cross bar or member 55 secured across its rear face at an appropriate height, and the opposite, free end of lever arm 54 has a notch 56 on which the cross bar 55 rests in the ground or loading position, as illustrated in FIG. 1. The lever arm is pivotally secured to axle 16 at an intermediate point in its length by any suitable means. In the preferred embodiment illustrated, the lever arm is welded to an outer ring 57 rotatably mounted around axle 16 in its central area, as best seen in FIGS. 3 and 4. Axle 16 may be of reduced diameter in this area to accommodate ring 57.

As illustrated in solid outline in FIG. 1, when the frame is in the ground position, the hydraulic jack is fully retracted and the lever arm 54 is generally horizontal. When the jack 48 is actuated, it extends to the dotted line position illustrated in Figure 1, urging the pivoted end of the lever arm 54 downwardly and rotating the arm clockwise about the axle 16 to raise the notched end of the lever arm, simultaneously urging the frame 22 upwardly via the engagement of bar 55 in notch 56. The frame therefore also rotates about the axle 16 due to the pivotal connection of pivot arms 36, until the arm 24 is inclined forwardly as illustrated in dotted outline in Figure 1. This corresponds to the first towing position in which the load is centered over the wheel assembly.

A first latch mechanism 58 is mounted on the end cross bar 45 of the tow bar assembly for releasably latching the frame 22 in the first towing position illustrated in dotted outline in FIG. 1. The mechanism comprises a latch member 60 pivotally connected at one end to connecting piece 62 which in turn is pivoted at 64 to the cross bar 45. Member 60 has a notch 66 at its free end for engagement over the cross bar 55 carried on lever arm 54 when in the fully extended position illustrated in FIG. 4. In this position the frame will be held against tipping forwards or back via the engagement of cross bar 55 with latch member 60 and lever arm 54, respectively. If the frame is to be rotated into the flat bed position of FIG. 7, the latch is simply rotated to one side into the retracted position illustrated in dotted outline in FIG. 5, and the frame can then be rotated in a clockwise direction from the position illustrated in FIG. 4 into the horizontal position illustrated in FIG. 7, in which the frame rests on the cross bar assembly.

Clearly, the length of the cross bar assembly must be sufficient to accommodate the length of arm 24 of the frame 22 in the horizontal, or second towing position. A second latch mechanism 68 is mounted at the forward end of the cross bar assembly for releasably latching the frame flat on the tow bar in the position illustrated in FIG. 7. The second latch mechanism comprises a pivot block 69 mounted at the forward end of tow bar 18, and a swing out latch finger 70 which is pivotally mounted on the block 69, as illustrated in FIGS. 1 and 7. When the frame is rotated into the horizontal flat bed position of FIG. 7, the forward end of arm or platform 24 rests on block 69. The finger 70 has a latch pin 72 which projects downwardly into a suitable latch opening at the forward end of arm 24 in the latching position illustrated in FIG. 7. When the frame is to be released, the finger 70 is simply rotated upwardly away from the frame into the released position illustrated in FIG. 1.

A leveling mechanism 74 is also provided at the forward end of the tow bar, to allow the frame to be leveled to the height of a vehicle tow hitch. The mechanism 74 comprises a first inclined member 75 having a through bore secured to the forward end of bar 18 and a second member 76 slidably engaged in the bore of member 75. Member 76 has a series of spaced through slots 78, and member 75 has a single through slot 80. Member 75 is slid up and down on member 76 to align a selected one of the slots 78 with slot 80. A connecting pin 82 is then extended through the aligned slots to connect the members together. The frame can be leveled by moving its forward end up or down by releasing pin 82 and sliding member 75 up or down on member 76 until a level position is reached, and then re-securing pin 82 in place. The tow bar assembly is secured to a vehicle towing point or hitch bar via tongue 84 which projects forwardly from member 76. A connecting pin 86 extends through aligned openings in the tongue 84 and hitch 20 in a standard fashion to connect the trailer assembly to a suitable vehicle. Latch finger 70 seats against inclined member 76 in the retracted position, as best illustrated in FIGS. 1 and 2.

The trailer assembly described above is versatile and easy to use in either of the two towing positions. Heavier loads can be carried in the first towing position of FIGS. 1 and 4, allowing the load to be secured on the frame in the ground position of Figure before lifting it into the inclined towing position of FIG. 4 using the hydraulic jack. The frame is secured in the towing position using the latch mechanism 58. The load may comprise a standard wheeled dolly and secured load, as described in my previous U.S. Pat. No. 4,666,359 referred to above, in which case it can be wheeled on and off the frame easily with no manual loading and unloading required, or may be any type of load simply secured to the frame via straps or other suitable fasteners.

If the flat bed towing position is to be used, the empty frame can simply be rotated manually from the ground position until it rests flat on the tow bar assembly, latching it in place via the second latch mechanism 68. The frame will simply lift off the lever arm 54 since there is no positive attachment between arm 54 and the frame. The arm 26 can be removed if desired. The load may be simply secured to the resultant flat platform in a standard manner. If necessary, vertical support posts 42 may be positioned in the sockets 41 for added support of the load.

Thus a convenient, secure and versatile towing assembly is provided by the arrangement described above. Two different towing positions of the frame are provided, which can be selected according to the type of load to be transported, for example. The inclined, or fork lift position over the trailer wheels will generally be used for heavier loads or where a standard wheeled dolly is to be used for carrying the load onto and off the trailer. For less heavy loads the flat bed position over the tow bar will generally be used.

Although a preferred embodiment of the present invention has been described above by way of example only, it will be understood by those skilled in the field that modifications may be made to the disclosed embodiment without departing from the scope of the invention, which is defined by the appended claims.

I Claim:

1. A trailer assembly for transporting a load behind a vehicle comprising:
   a wheel assembly comprising spaced wheels and an axle connecting the wheels;
   an elongate tow bar assembly projecting forwardly from the wheel assembly and including securing means at its forward end for securing said assembly to the towing point of a vehicle;
   a load supporting frame pivotally secured to the wheel assembly for movement between a ground position in which the frame is subtantially vertical, a first towing position in which the frame is inclined forwardly of said vertical position, and a second, flat towing position in which the frame projects horizontally from the wheel assembly in the same direction as said tow bar assembly to form a flat bed trailer;
   power means for moving said frame between said ground and said first positions; and
   a first releasable latch for releasably latching said frame in said first towing position.

2. The assembly as claimed in claim 1, further including
   a second releasable latch for releasably latching said frame in said second towing position.

3. The assembly as claimed in claim 2, wherein said second latch is pivotally mounted at the forward end of said tow bar assembly and movable between an extended, rearwardly projecting position for latching engagement with said frame in said second towing position and a retracted position releasing said frame.

4. The assembly as claimed in claim 1, wherein power means acts between said tow bar assembly and said frame for urging said frame between said ground position and said first towing position.

5. The assembly as claimed in claim 4 power means comprises a lever arm extending transverse to said axle and pivotally connected to said axle at an intermediate point in its length, and a jack pivotally connected at one end to the rear end of said tow bar assembly and at the opposite end to one end of said lever arm, the opposite end of said lever arm comprising bearing means for bearing against said frame to urge said frame from said ground position towards said first towing position as said jack is extended.

6. The assembly as claimed in claim 5, wherein said frame has a horizontal cross bar at the height of said lever arm when said jack is retracted and said frame is in said ground position, and said lever arm has a notch at said opposite end on which said cross bar is seated in said ground position.

7. The assembly as claimed in claim 1, wherein said frame is generally L-shaped, comprising a longer arm which is upright in said ground position and comprises a horizontal load supporting platform in said second towing position, and a shorter arm which is horizontal in said ground position and tilted to comprise a load supporting platform in said first towing position.

8. The assembly as claimed in claim 7, wherein said shorter arm is releasably on said frame.

9. The assembly as claimed in claim 1, including leveling means at the forward end of said tow bar assembly for adjusting the level of said forward end to the level of a vehicle tow hitch.

10. The assembly as claimed in claim 1, wherein said tow bar assembly is of a length sufficient to accommodate said frame in said second towing position, and said tow bar assembly comprises means for supporting said frame in said second towing position.

11. The assembly as claimed in claim 1, wherein said frame has sockets for receiving vertical support posts in said second towing position.

12. The assembly as claimed in claim 1, wherein said frame has a first load carrying platform for supporting a load in said first towing position and a second load carrying platform perpendicular to said first platform for supporting a load in said second towing position, and said first load supporting platform is located above said wheel assembly in said first towing position.

13. The assembly as claimed in claim 1, wherein the frame is pivotally mounted on said axle.

14. The assembly as claimed in claim 13, including releasable pivot means for releasably mounting said frame on said axle.

15. The assembly as claimed in claim 13, wherein said frame has a front, load supporting side and a rear side, and includes a pair of spaced pivot arms projecting from said rear side and pivotal connecting means at the free ends of the pivot arms for pivotally connecting them at spaced positions on said axle.

16. The assembly as claimed in claim 15, wherein said axle is offset forwardly from said wheels.

17. The assembly as claimed in claim 1, wherein said first latch is pivotally mounted on the rear end of said tow bar assembly for movement between an extended, rearwardly projecting position engaging said frame in said first towing position, and a retracted position releasing said frame.

* * * * *